United States Patent Office 3,415,873
Patented Dec. 10, 1968

3,415,873
1-AMINO-3-INDANYLOXY- AND TETRAHYDRO-NAPHTHOXY-2-PROPANOLS AND THE SALTS THEREOF
Marcus Andrew Stevens, Macclesfield, England, assignor to Imperial Chemical Industries Limited, London, England, a corporation of Great Britain
No Drawing. Filed Dec. 2, 1963, Ser. No. 327,545
Claims priority, application Great Britain, Dec. 17, 1962, 47,455/62
5 Claims. (Cl. 260—501.18)

This invention relates to new homocyclic compounds and more particularly it relates to new tetrahydronaphthalene and indane derivatives which possess β-adrenergic blocking activity and which are therefore useful in the treatment or prophylaxis of coronary artery disease.

According to the invention we provide homocyclic compounds of the formula:

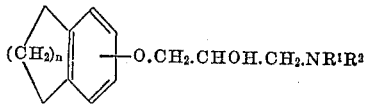

wherein $R^1$ stands for hydrogen or an alkyl or aralkyl radical, wherein $R^2$ stands for hydrogen, or an alkyl, cycloalkyl, alkenyl or aralkyl radical, any of which may optionally be substituted, wherein $n$ stands for 1 or 2, and wherein the homocyclic nucleus may optionally bear one or more additional substituents, and the esters thereof, and the salts thereof, but excluding the compounds 1-methylamino- and 1-dimethylamino-3-(5,6,7,8-tetrahydro-2-naphthoxy)-2-propanol, and 1-(4-indanyloxy)-3-(N-benzyl-N-methylamino)-2-propanol, and the salts thereof.

It is to be understood that the above definition of homocyclic compounds encompasses all possible stereoisomers thereof, and mixtures thereof.

As a suitable value for $R^1$ when it stands for an alkyl radical there may be mentioned, for example, an alkyl radical of not more than 10 carbon atoms, for example the methyl or isopropyl radical. As a suitable value for $R^1$ when it stands for an aralkyl radical there may be mentioned, for example, an aralkyl radical of not more than 15 carbon atoms, for example the benzyl radical.

As a suitable value for $R^2$ when it stands for an alkyl radical there may be mentioned, for example, an alkyl radical of not more than 10 carbon atoms, for example the ethyl, n-propyl, isopropyl, n-butyl, s-butyl, n-hexyl, n-octyl or 2-ethylhexyl radical. As a suitable value for $R^2$ when it stands for a substituted alkyl radical there may be mentioned, for example, an alkyl radical of not more than 10 carbon atoms bearing one or more hydroxy or alkoxy radicals, for example alkoxy radicals of not more than 5 carbon atoms, for example the n-propoxy radical. As a suitable value for $R^2$ when it stands for an aralkyl radical, optionally substituted, there may be mentioned, for example, an aralkyl radical of not more than 15 carbon atoms, optionally substituted with, for example, one or more halogen atoms, for example one or more chlorine atoms. Thus, specific values for $R^2$ when it stands for a substituted alkyl radical or an unsubstituted or substituted aralkyl radical are the 2-hydroxy-1,1-dimethylethyl, 2-n-propoxyethyl, benzyl, 1-methyl-3-phenylpropyl, 1,1-dimethyl-3-phenylpropyl or 3-p-chlorophenyl-1,1-dimethylpropyl radical. As a suitable value for $R^2$ when it stands for a cycloalkyl radical there may be mentioned, for example, a cycloalkyl radical of not more than 10 carbon atoms, for example the cyclohexyl radical. As a suitable value for $R^2$ when it stands for an alkenyl radical there may be mentioned, for example, an alkenyl radical of not more than 10 carbon atoms, for example the allyl radical.

As suitable optional additional substituents in the homocyclic nucleus of the compounds of the invention there may be mentioned, for example, one or more halogen atoms, for example one or more chlorine or bromine atoms, or hydroxy radicals, or alkyl or alkoxy radicals of not more than 5 carbon atoms, for example the methyl, ethyl, methoxy or ethoxy radical.

As suitable esters of the said homocyclic compounds there may be mentioned, for example, O-esters derived from an acid of the formula $R^3.COOH$, wherein $R^3$ stands for an alkyl, alkenyl or aryl radical, any of which may optionally be substituted, for example an alkyl or alkenyl radical of not more than 20 carbon atoms, for example the methyl, n-pentadecyl, n-heptadecyl or n-heptadeca-8-enyl radical, or an aryl radical of not more than 10 carbon atoms, for example the phenyl radical, and the salts thereof.

Specific compounds of the invention are, for example, 1-isopropylamino-3-(5,6,7,8-tetrahydro-1-naphthoxy)-2-propanol,
1-s-butylamino-3-(5,6,7,8-tetrahydro-1-naphthoxy)-2-propanol,
1-n-hexylamino-3-(5,6,7,8-tetrahydro-1-naphthoxy)-2-propanol,
1-n-octylamino-3-(5,6,7,8-tetrahydro-1-naphthoxy)-2-propanol,
1-(4-indanyloxy)-3-isopropylamino-2-propanol,
1-(5-indanyloxy)-3-isopropylamino-2-propanol,
1-benzylamino-3-(5,6,7,8-tetrahydro-1-naphthoxy)-2-propanol,
1-ethylamino-3-(5,6,7,8-tetrahydro-1-naphthoxy)-2-propanol,
1-n-propylamino-3-(5,6,7,8-tetrahydro-1-naphthoxy)-2-propanol,
1-(3-p-chlorophenyl-1,1-dimethylpropylamino)-3-(5,6,7,8-tetrahydro-1-naphthoxy)-2-propanol,
1-(2-n-propoxyethylamino)-3-(5,6,7,8-tetrahydro-1-naphthoxy)-2-propanol,
1-(1-methyl-3-phenylpropylamino)-3-(5,6,7,8-tetrahydro-1-naphthoxy)-2-propanol,
1-(2-ethylhexylamino)-3-(5,6,7,8-tetrahydro-1-naphthoxy)-2-propanol,
1-cyclohexylamino-3-(5,6,7,8-tetrahydro-1-naphthoxy)-2-propanol,
1-allylamino-3-(5,6,7,8-tetrahydro-1-naphthoxy)-2-propanol,
1-(2-hydroxy-1,1-dimethylethylamino)-3-(5,6,7,8-tetrahydro-1-naphthoxy)-2-propanol,
1-n-butylamino-3-(5,6,7,8-tetrahydro-1-naphthoxy)-2-propanol,
1-(N-benzyl-N-isopropylamino)-3-(5,6,7,8-tetrahydro-1-naphthoxy)-2-propanol,
1-isopropylamino-3-(5,6,7,8-tetrahydro-2-naphthoxy)-2-propanol,
1-amino-3-(5,6,7,8-tetrahydro-1-naphthoxy)-2-propanol,
1-isopropylaminomethyl-2-(5,6,7,8-tetrahydro-1-naphthoxy)ethyl acetate and
1-isopropylamino-3-(4-chloro-5,6,7,8-tetrahydro-1-naphthoxy)-2-propanol, and the salts thereof, and, of these, particularly valuable compounds are 1-isopropylamino-3-(5,6,7,8-tetrahydro-1-naphthoxy)-2-propanol,
1-s-butylamino-3-(5,6,7,8-tetrahydro-1-naphthoxy)-2-propanol,
1-(4-indanyloxy)-3-isopropylamino-2-propanol,
1-(5-indanyloxy)-3-isopropylamino-2-propanol,
1-(1-methyl-3-phenylpropylamino)-3-(5,6,7,8-tetrahydro-1-naphthoxy)-2-propanol,
1-allylamino-3-(5,6,7,8-tetrahydro-1-naphthoxy)-2-propanol and 1-isopropylamino-3-(5,6,7,8-tetrahydro-2-naphthoxy)-2-propanol, and the salts thereof.

As suitable salts of the homocyclic compounds of the invention there may be mentioned acid-addition salts, for example salts derived from inorganic acids, for example hydrochlorides, hydrobromides, phosphates or sulphates, or salts derived from organic acids, for example oxalates, lactates, tartrates, acetates, salicylates, citrates, benzoates, naphthoates, o-acetoxybenzoates, adipates, maleates or 1,1 - methylene - bis - (2-hydroxy-3-naphthoates), or salts derived from acidic synthetic resins, for example sulphonated polystyrene resins, for example "Zeo-Karb" 225 ("Zeo-Karb" is a trademark). Relatively insoluble salts, for example the 1,1'-methylene-bis-(2-hydroxy-3-naphthoates), have the advantage that they afford prolonged blood levels of the medicament.

According to a further feature of the invention we provide a process for the manufacture of the homocyclic compounds of the invention which comprises the interaction of a halogeno compound of the formula:

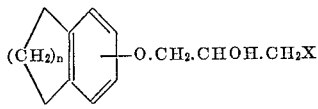

wherein X stands for a halogen atom, $n$ has the meaning stated above, and the homocyclic nucleus may optionally bear one or more additional substituents, with an amine of the formula $NHR^1R^2$, wherein $R^1$ and $R^2$ have the meanings stated above.

As a suitable value for X there may be mentioned, for example, a chlorine or bromine atom. The above-mentioned interaction may be conveniently accelerated or completed by the application of heat.

According to a further feature of the invention we provide a process for the manufacture of the homocyclic compounds of the invention which comprises the interaction of an epoxide of the formula:

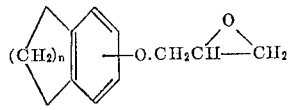

wherein $n$ has the meaning stated above and the homocyclic nucleus may optionally bear one or more additional substituents, with an amine of the formula $NHR^1R^2$, wherein $R^1$ and $R^2$ have the meanings stated above.

This process may be carried out in the presence of a diluent or solvent, for example ethanol, and it may be accelerated or completed by the application of heat.

According to a further feature of the invention we provide a process for the manufacture of the homocyclic compounds of the invention which comprises the interaction of a compound of the formula

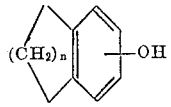

wherein $n$ has the meaning stated above and the homocyclic nucleus may optionally bear one or more additional substituents, with a compound of the formula:

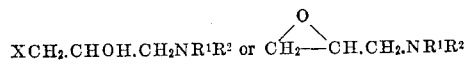

$XCH_2.CHOH.CH_2NR^1R^2$ or $CH_2\text{---}CH.CH_2.NR^1R^2$ wherein $R^1$, $R^2$ and X have the meanings stated above.

The interaction involving a halogenopropanolamine may be conveniently carried out in the presence of an acid-binding agent, or, alternatively, an alkali metal derivative of the tetrahydronaphthol or indanol derivative, for example the sodium or potassium derivative, may be used as starting material.

According to a further feature of the invention we provide a process for the manufacture of those of the homocyclic compounds of the invention wherein $R^1$ stands for hydrogen and $R^2$ stands for a radical of the formula —$CHR^4R^5$, wherein $R^4$ stands for hydrogen or an alkyl radical, and $R^5$ stands for an alkyl, alkenyl or aralkyl radical, optionally substituted, or wherein $R^4$ and $R^5$ are joined together with the adjacent carbon atom to form a cycloalkyl radical, which comprises the interaction of an amino derivative of the formula:

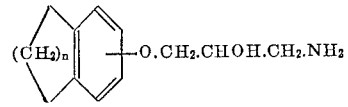

wherein $n$ has the meaning stated above and the homocyclic nucleus may optionally bear one or more additional substituents, or a salt thereof, with a carbonyl compound of the formula $R^4.CO.R^5$, wherein $R^4$ and $R^5$ have the meanings stated above, under reducing conditions.

Suitable reducing conditions are those provided by the presence of hydrogen and a hydrogenation catalyst, for example platinum, in an inert diluent or solvent, for example ethanol, and/or, in the case where, in the carbonyl compound used as starting material, $R^4$ stands for an alkyl radical, in an excess of the carbonyl compound used as starting material; or those provided by the presence of an alkali metal borohydride, for example sodium borohydride, in an inert diluent or solvent, for example aqueous methanol, and/or in an excess of the carbonyl compound used as starting material. It is to be understood that, in the case where $R^5$ stands for an alkenyl radical, if it is desired that the alkenyl radical is not reduced to the corresponding alkyl radical during this process, suitable reducing conditions, for example those provided by the presence of sodium borohydride, must be used.

It is to be understood that the said amino derivatives may be generated in situ by, for example, reduction of the corresponding α-diazoketone, α-azidoketone, α-hydroxyiminoketone, α-nitro-ketone, α-nitro-alcohol, cyanhydrin or acyl cyanide.

According to a further feature of the invention we provide a process for the manufacture of those of the homocyclic compounds of the invention wherein $n$ stands for 2, which comprises the reduction of a naphthalene derivative of the formula:

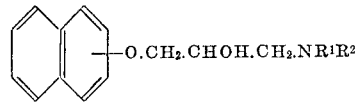

wherein $R^1$ and $R^2$ have the meanings stated above, and the naphthalene nucleus may optionally bear one or more additional substituents.

The last-named reduction may be carried out by, for example, catalytic hydrogenation, for example hydrogenation in the presence of a rhodium-on-carbon or palladium-on-carbon catalyst. The hydrogenation may be carried out in an inert diluent or solvent, for example ethanol.

The naphthalene derivatives used as starting material may be obtained by the interaction of a compound of the formula:

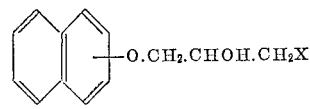

wherein X has the meaning stated above, and the naphthalene nucleus may optionally bear one or more additional substituents, with an amine of the formula $NHR^1R^2$, wherein $R^1$ and $R^2$ have the meanings stated above. This interaction may conveniently be accelerated or completed by the application of heat.

According to a further feature of the invention we provide a process for the manufacture of those of the homocyclic compounds of the invention wherein $R^1$ stands for hydrogen, which comprises the hydrogenolysis of a compound of the formula:

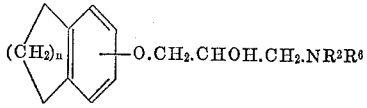

wherein $n$ and $R^2$ have the meanings stated above and the homocyclic nucleus may optionally bear one or more additional substituents, and wherein $R^6$ stands for a hydrogenolysable radical.

As a suitable value for $R^6$ there may be mentioned, for example, the benzyl radical. The hydrogenolysis may be effected by catalytic hydrogenation, for example hydrogenation in the presence of a palladium-on-carbon catalyst. The hydrogenation may be carried out in an inert diluent or solvent, for example ethanol.

According to a further feature of the invention we provide a process for the manufacture of the esters of the invention which comprises the acylation of the corresponding homocyclic derivative.

As suitable acylating agents there may be mentioned, for example, acid halides or anhydrides derived from acids of the formula $R^3 \cdot COOH$, wherein $R^3$ has the meaning stated above, for example acetic anhydride, acetyl chloride or benzoyl chloride. The acylation may be carried out in a diluent or solvent, which, in the case where an acid anhydride is used, may conveniently be the acid from which the anhydride is derived.

As stated above, the homocyclic compounds of this invention are useful in the treatment or prophylaxis of coronary artery disease.

According to a further feature of the invention, therefore, we provide pharmaceutical compositions comprising at least one homocyclic compound of the formula:

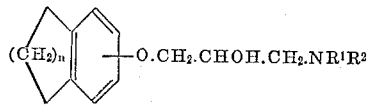

wherein $R^1$, $R^2$ and $n$ have the meanings stated above and the homocyclic nucleus may optionally bear one or more additional substituents, or an ester thereof, or a salt thereof, in admixture with a pharmaceutically-acceptable diluent or carrier.

The pharmaceutical compositions of the invention may be in the form of tablets, capsules, aqueous or oily solutions, aqueous or oily suspensions, emulsions, sterile injectable aqueous or oily solutions or suspensions, or dispersible powders.

Suitable tablets may be formulated by admixture of the active ingredient(s) with known pharmaceutical excipients, for example inert diluents, for example calcium carbonate, calcium phosphate or lactose, disintegrating agents, for example maize starch or alginic acid, binding agents, for example starch, gelatin or acacia mucilage, and lubricating agents, for example magnesium stearate, stearic acid or talc. Such tablets may optionally be coated by known techniques in order to delay disintegration in the stomach and thus to provide a sustained action over an extended period.

The aqueous suspensions, emulsions, oily solutions and suspensions of the invention generally contain a sweetening agent, for example glycerol, dextrose or sucrose, and a flavouring agent, for example vanillin or orange extract, in order to provide a palatable product. The aqueous suspensions of the invention may also contain suspending or thickening agents, for example sodium carboxymethylcellulose, wetting agents, for example condensation products of fatty alcohols with ethylene oxide, and preservatives, for example methyl or propyl p-hydroxyzenzoate.

The emulsions of the invention may contain the active ingredient(s) dissolved in an oil of vegetable or animal origin, for example arachis oil or cod liver oil, and may also contain sweetening agents and flavouring agents which may with advantage be essential oils. The said emulsions may also contain emulsifying agents and dispersing agents, for example soya bean lecithin, polyoxyethylene sorbitan monooleate, gum acacia, gum tragacanth or casein, and preservatives, for example methyl or propyl p-hydroxybenzoate, and anti-oxidants, for example propyl gallate.

The oily solutions of the invention likewise contain the active ingredient(s) in solution in an oil of vegetable or animal origin, and may optionally contain flavouring agents to mask the taste and improve oral acceptability. Such oily solutions may advantageously be filled into soft gelatin capsules. The oily solutions may also contain sweetening agents, for example icing sugar, in which case the oil phase may in addition contain a suspending agent, for example beeswax, to maintain the redispersion properties of the suspension.

Oral compositions in the form of gelatin capsules may consist of capsules containing active ingredient(s) only or the capsules may contain the active ingredient(s) in admixture with inert diluents, for example lactose or sorbitol.

The sterile injectable aqueous suspensions of the invention may contain a suspending or thickening agent, for example sodium carboxymethylcellulose, and a wetting or dispersing agent, for example a phenolpolyethylene oxide condensate, for example the condensation product of octylcresol with about 8–10 molecular proportions of ethylene oxide. The sterile injectable oily solutions of the invention may be prepared from a non-toxic injectable oil, for example arachis oil or ethyl oleate, and they may additionally contain gelling agents, for example aluminium stearate, to delay absorption within the body. These aqueous and oily injectable preparations may contain preservatives such as methyl or n-propyl p-hydroxybenzoate, or chlorobutanol.

The invention is illustrated but not limited by the following examples in which the parts are by weight:

Example 1

A mixture of 13 parts of 1-chloro-3-(5,6,7,8-tetrahydro-1-naphthoxy)-2-propanol and 8 parts of isopropylamine is heated under a reflux for 10 hours. The reaction mixture is cooled, and 50 parts of water are added. The mixture is acidified with 2 N-hydrochloric acid and washed twice with 20 parts of ether. The aqueous phase is decolourised with charcoal, and then added to a mixture of ice and 4 N-sodium hydroxide solution. The mixture is filtered, and the solid residue is crystallised from petroleum ether (B.P. 80–100° C.). There is thus obtained 1-isopropylamino-3-(5,6,7,8-tetrahydro-1-naphthoxy)-2-propanol, M.P. 85° C. (hydrochloride, M.P. 158–159° C.)

The 1 - chloro - 3 - (5,6,7,8 - tetrahydro - 1 - naphthoxy)-2-propanol used as starting material may be obtained as follows:

A mixture of 8 parts of 5,6,7,8-tetrahydro-1-naphthol, 22 parts of epichlorhydrin and 0.12 part of piperidine is heated at 100° C. for 6 hours. The piperidine and the excess of epichlorohydrin are removed by evaporation under reduced pressure, the residue is fractionally distilled in vacuo, and there is thus obtained 1-chloro-3-(5,6,7,8-tetrahydro-1-naphthoxy)-2-propanol, B.P. 110–113° C. at 0.05 mm. pressure, $n_D^{17}$ 1.5500.

Example 2

4 parts of 1-chloro-3-(5,6,7,8-tetrahydro-1-naphthoxy)-2-propanol and 9 parts of s-butylamine are refluxed together for 10 hours. The excess of the s-butylamine is then removed by evaporation under reduced pressure. The residue is crystallised from petroleum ether (B.P. 40–60° C.). It consists of 1-s-butylamino-3-(5,6,7,8-tetrahydro-1-naphthoxy)-2-propanol, M.P. 68° C. 2.4 parts of the base are dissolved in 15 parts of methanol, 1 part of concentrated hydrochloric acid is added, and the solution is evaporated to dryness. The residue is crystallised from ethyl acetate, and and there is obtained 1-s-butylamino-3 - (5,6,7,8 - tetrahydro - 1 - naphthoxy) - 2 - propanol hydrochloride, M.P. 135° C.

Example 3

The process described in Example 2 is repeated except that the s-butylamine is replaced by n-hexylamine. There is thus obtained 1-n-hexylamino-3-(5,6,7,8-tetrahydro-1-naphthoxy)-2-propanol hydrochloride, M.P. 126° C.

Example 4

The process described in Example 2 is repeated except that the s-butylamine is replaced by n-octylamine. There is thus obtained 1-n - octylamino - 3-(5,6,7,8 - tetrahydro-1-naphthoxy)-2-propanol hydrochloride, M.P. 153° C.

Example 5

2 parts of 1-chloro-3-(4-indanyloxy)-2-propanol and 8 parts of isopropylamine are heated together under reflux for 10 hours. The mixture is evaporated under reduced pressure and the residue is crystallised from petroleum ether (B.P. 80–100° C.) to give 1-isopropylamino-3-(4-indanyloxy)-2-propanol, M.P. 105° C. The base is dissolved in 3 parts of methanol, 0.3 part of concentrated hydrochloric acid is added, and the solution is evaporated to dryness. The residue is crystallised from ethyl acetate, and there is obtained 1-(4-indanyloxy)-3-isopropylamino-2-propanol hydrochloride, M.P. 153° C.

Example 6

2 parts of 1-chloro-3-(5-indanyloxy)-2-propanol and 8 parts of isopropylamine are heated together under reflux for 10 hours. The mixture is evaporated under reduced pressure and the residue is crystallised from petroleum ether (B.P. 60–80° C.). There is thus obtained 1-(5-indanyloxy)-3-isopropylamino-2-propanol, M.P. 83° C.

The 1-chloro-3-(5-indanyloxy)-2-propanol used as a starting material may be obtained as follows:

5 parts of 5-hydroxyindane, 18 parts of epichlorohydrin and 0.1 part of piperidine are heated toegther at 100° C. for 6 hours. The excess of epichlorohydrin is distilled off and the remaining oil is fractionally distilled under reduced pressure. The fraction boiling at 128° C./0.3 mm. consists essentially of 1-chloro-3-(5-indanyloxy)-2-propanol.

Example 7

A mixture of 2 parts of 1,2-epoxy-3-(5,6,7,8-tetrahydro-1-naphthoxy)-propane and 8 parts of benzylamine is heated at 100° C. for 10 hours. The excess of benzylamine is then removed by distillation under reduced pressure, and the residue is crystallised from ethanol. There is thus obtained 1-benzylamino-3-(5,6,7,8-tetrahydro-1-naphthoxy) 2-propanol, M.P. 95° C. This base is dissolved in 5 parts of methanol containing 0.25 part of concentrated hydrochloric acid. The solution is evaporated to dryness, and the residue is crystallised from ethyl acetate. There is thus obtained 1-benzylamino-3-(5,6,7,8 - tetrahydro-1-naphthioxy)-2-propanol hydrochloride, M.P. 166° C.

The 1,2 - epoxy-3-(5,6,7,8 - tetrahydro-1-naphthoxy)-propane used as starting material may be obtained as follows:

14 parts of epichorhydrin are added to a stirred solution of 15 parts of 5,6,7,8-tetrahydro-1-naphthol and 5 parts of sodium hydroxide in 100 parts of water, and the resulting mixture is stirred at ambient temperature for 15 hours. The resulting oily suspension is extracted twice, each time with 25 parts of chloroform, and the combined chloroform extracts are washed with 5 parts of 10% aqueous acetic acid and then when 10 parts of water. The chloroform solution is dried over anhydrous magnesium sulphate, and the solvent is evaporated. The residue is fractionally distilled in vacuo, and there is obtained 1,2- epoxy - 3 - (5,6,7,8-tetrahydro-1-naphthoxy) - propane B.P. 136° C./0.15 mm.

Example 8

5.2 parts of 1-isopropylamino-3-(1-naphthoxy)-2-propanol are dissolved in 32 parts of ethanol, 0.5 part of 5% rhodium-on-carbon is added, and the resulting suspension is shaken in an atmosphere of hydrogen at 145 atmospheres and 132° C. for seven hours. The mixture is then cooled and filtered, and the filtrate is evaporated. The residue is crystallised from petroleum ether (B.P. 60–80° C.), and there is obtained 1-isopropylamino-3-(5,6,7,8-tetrahydro-1-naphthoxy)-2-propanol, M.P. 85° C.

Example 9

4 parts of 1-chloro-3-(5,6,7,8-tetrahydro-1-naphthoxy)-2-propanol and 4 parts of ethylamine are heated together at 100° C. in a sealed vessel for 10 hours. The excess of ethylamine is removed by evaporation, and the residue is crystallised from petroleum ether (B.P. 60–80° C.). There is thus obtained 1-ethylamino-3-(5,6,7,8-tetrahydro-1-naphthoxy)-2-propanol, M.P. 88° C.

In a similar manner by the use of the appropriate amine in place of ethylamine the compounds listed below are obtained. The hydrochlorides and oxalates are obtained by dissolution of the base in ether, addition of an ethereal solution by hydrogen chloride or oxalic acid in ether, filtration of the resulting mixture, and crystallisation of the solid residue.

1 - n-propylamino-3-(5,6,7,8-tetrahydro-1-naphthoxy)-2-propanol, M.P. 100–101° C. (crystallised from hexane), 1 - (3-p-chlorophenyl-1,1-dimethylpropylamino)-3-(5,6,7,8 - tetrahydro-1-naphthoxy)-2-propanol hydrochloride, M.P. 156–158° C. (crystallised from a mixture of ethanol and ethyl acetate; the 3-p-chlorophenyl-1,1-dimethylpropylamine used as starting material may be obtained in an analogous manner to the known method for the preparation of 1,1-dimethyl-3-phenylpropylamine, 1 - (2 - n - propoxyethylamino)-3-(5,6,7,8-tetrahydro-1-naphthoxy)-2-propanol hydrogen oxalate, M.P. 264–265° C. (crystallised from ethanol), 1-(1-methyl-3-phenylpropylamino) - 3 - (5,6,7,8-tetrahydro-1-naphthoxy)-2-propanol hydrochloride, M.P. 145–146° C. (crystallised from a mixture of petroleum-ether [B.P. 80–100° C.) and ethanol], 1-(2-ethylhexylamino)-3-(5,6,7,8-tetrahydro-1-naphthoxy)-2-propanol hydrochloride, M.P. 114–115° C. [crystallised from a mixture of petroleum ether (B.P. 60–80° C.) and ethyl acetate], 1-allylamino-3-(5, 6,7,8-tetrahydro-1-naphthoxy)-2-propanol, M.P. 69–71° C. [crystallised from petroleum ether (B.P. 40–60° C.)], and 1 - (2-hydroxy-1,1-dimethylethylamino)-3-(5,6,7,8-tetrahydro-1-naphthoxy)-2-propanol hydrogen oxalate, M.P. 201–202° C. (crystallised from aqueous methanol).

Example 10

The process described in Example 2 is repeated except that the s-butylamine is replaced by n-butylamine. There is thus obtained 1-n-butylamino-3-(5,6,7,8-tetrahydro-1-naphthoxy)-2-propanol hydrochloride, M.P. 120° C.

Example 11

1.48 parts of 5,6,7,8-tetrahydro-1-naphthol are added to a solution of 0.46 part of sodium in 20 parts of ethanol. To the mixture thus obtained there are added 2.24 parts of 1-(N-benzyl-N-isopropylamino)-3-chloro-2-propanol. The mixture is then heated in a sealed vessel at 100° C. for 10 hours. The contents of the vessel are then evaporated under reduced pressure. 10% hydrochloric acid is added to the residue, and the mixture is washed twice, each time with 10 parts of ether. The aqueous solution is made alkaline by the addition of 10% sodium hydroxide solution, and the resulting mixture is extracted twice, each time with 10 parts of ether. The combined ethereal extracts are evaporated. 2 parts of a saturated solution of picric acid in ethanol are added to the residue. The mixture is filtered and the solid residue is shaken together with a mixture of 7 parts of an ammonia solution (density 0.88), 7 parts of water and 20 parts of ethyl acetate. The mixture is separated, both phases being retained. The aqueous layer is extracted twice, each time with 20 parts of ethyl acetate, and the combined ethyl acetate extracts are dried over anhydrous magnesium sulphate. The solvent is evaporated, and there is obtained 1 - (N - benzyl-N-isopropylamino)-3-(5,6,7,8-tetrahydro-1-naphthoxy)-2-propanol.

Example 12

A mixture of 0.75 part of 1-(N-benzyl-N-isopropylamino) - 3-(5,6,7,8-tetrahydro-1-naphthoxy)-2-propanol, 30 parts of ethanol, 0.3 part of saturated ethanolic hydrogen chloride, and 0.3 part of 5% palladium-on-carbon catalyst is shaken in an atmosphere of hydrogen at atmospheric pressure and ambient temperature for 20 minutes. The mixture is filtered and the filtrate is evaporated to dryness under reduced pressure. To the residue is added 1 part of 10 N-sodium hydroxide solution. The resulting mixture is extracted twice, each time with 10 parts of ether, and the combined extracts are evaporated to dryness. The solid residue is crystallised from petroleum ether (B.P. 40–60° C.). There is thus obtained 1-isopropylamino - 3 - (5,6,7,8-tetrahydro-1-naphthoxy)-2-propanol, M.P. 85° C.

Example 13

3 parts of 1-chloro-3-(5,6,7,8-tetrahydro-2-naphthoxy)-2-propanol and 12 parts of isopropylamine are heated together under reflux for 10 hours. The mixture is evaporated to dryness, and the residue is crystallised from petroleum ether (B.P. 80–100° C.). There is thus obtained 1 - isopropylamino - 3-(5,6,7,8-tetrahydro-2-napthoxy)-2-propanol, M.P. 83° C.

The 1 - chloro - 3-(5,6,7,8-tetrahydro-2-naphthoxy)-2-propanol used as starting material may be obtained as follows:

14 parts of 5,6,7,8-tetrahydro-2-naphthol, 50 parts of epichlorohydrin and 0.25 part of piperidine are heated together under reflux for 6 hours. The excess of epichlorohydrin is then removed by evaporation, and the residue is fractionally distilled under reduced pressure. There is thus obtained 1-chloro-3-(5,6,7,8-tetrahydro-2-napthoxy)-2-propanol, B.P. 113° C./0.05 mm.

Example 14

A mixture of 1 part of 1-amino-3-(1-naphthoxy)-2-propanol, 50 parts of ethanol, and 0.25 part of 5% rhodium-on-carbon catalyst is shaken in an atmosphere of hydrogen at 130 atmospheres and 130° C. for 7 hours. The mixture is cooled and filtered, and the filtrate is evaporated to dryness under reduced pressure. The residue is crystallised from cyclohexane, and there is thus obtained 1 - amino-3-(5,6,7,8-tetrahydro-1-naphthoxy)-2-propanol, M.P. 125–126° C.

The above procedure is repeated except that the hydrogenation is carried out at 90° C. or the 5% rhodium-on-carbon catalyst is replaced by a 5% palladium-on-carbon catalyst, and in a similar manner there is obtained 1-amino - 3 - (5,6,7,8-tetrahydro-1-naphthoxy)-2-propanol, M.P. 125–126° C.

Example 15

A mixture of 0.2 part of 1-amino-3-(5,6,7,8-tetrahydro-1-naphthoxy)-2-propanol, 10 parts of acetone and 0.05 part of platinum oxide is shaken in an atmosphere of hydrogen at atmospheric pressure and ambient temperature for 18 hours. The mixture is filtered, and the filtrate is evaporated to dryness under reduced pressure. The residue is crystallised from petroleum ether (B.P. 60–80° C.), and there is obtained 1-isopropylamino-3-(5,6,7,8-tetrahydro-1-naphthoxy)-2-propanol, M.P. 85° C.

Example 16

A mixture of 0.75 part of 1-isopropylamino-3-(5,6,7,8-tetrahydro-1-naphthoxy)-2-propanol and 6 parts of acetyl chloride is heated under reflux for 2 hours. The mixture is cooled, 50 parts of ether are added. The mixture is filtered, and the solid residue is washed with ether and then crystallised from benzene. There is thus obtained 1-isopropylaminomethyl-2-(5,6,7,8-tetrahydro-1-naphthoxy) ethyl acetate as its hydrochloride, M.P. 146° C.

Example 17

2 parts of 1-chloro-3-(4-chloro-5,6,7,8-tetrahydro-1-naphthoxy)-2-propanol and 8 parts of isopropylamine are heated together under reflux for 10 hours. The solution is evaporated to dryness and the residue is crystallised from 50% aqueous ethanol. There is thus obtained 1-(4-chloro - 5,6,7,8 - tetrahydro-1-naphthoxy)-3-isopropylamino-2-propanol, M.P. 95° C.

The 1-chloro-3-(4-chloro-5,6,7,8-tetrahydro-1-naphthoxy)-2-propanol used as starting material may be obtained as follows:

2.5 parts of 4-chloro-5,6,7,8-tetrahydro-1-naphthol are heated for 5 hours at 100° C. together with 9 parts of epichlorohydrin and 0.1 part of piperidine. The resulting mixture is fractionally distilled in vacuo, and there is thus obtained 1-chloro-3-(4-chloro-5,6,7,8-tetrahydro-1-naphthoxy)-2-propanol, B.P. 32° C./0.7 mm., M.P. 75° C.

Example 18

A mixture of 50 parts of 1-isopropylamino-3-(5,6,7,8-tetrahydro-1-naphthoxy)-2-propanol, 125 parts of maize starch, 270 parts of calcium phosphate and 1 part of magnesium stearate is compressed, and the compressed mixture is then broken down into granules by passage through a 16-mesh screen. The resultant granules are then compressed into tablets according to the known art. There are thus obtained tablets suitable for therapeutic purposes.

The 1-isopropylamino-3-(5,6,7,8-tetrahydro-1-naphthoxy)-2-propanol is replaced by 1-s-butylamino-3-(5,6,7,8-tetrahydro-1-naphthoxy)-2-propanol hydrochloride, 1-(4-indanyloxy)-3-isopropylamino-2-propanol hydrochloride, 1-(5-indanyloxy)-3-isopropylamino-2-propanol, 1-(1 - methyl-3-phenylpropylamino)-3-(5,6,7,8-tetrahydro-1-naphthoxy)-2-propanol hydrochloride, 1-allylamino-3-(5,6,7,8-tetrahydro-1-naphthoxy)-2-propanol or 1-isopropylamino - 3 - (5,6,7,8-tetrahydro-2-naphthoxy)-2-propanol, and in a similar manner there are obtained tablets that are suitable for therapeutic purposes.

Example 19

A solution of 1 part of 1-isopropylamino-3-(5,6,7,8-tetrahydro-1-naphthoxy)-2-propanol hydrochloride in 100 parts of distilled water is filled into ampoules. The ampoules are sealed and then heated at 115° C. for 30 minutes. There are thus obtained ampoules containing a sterile aqueous solution suitable for parenteral administration for therapeutic purposes.

What I claim is:

1. A homocyclic compound selected from compounds of the formula:

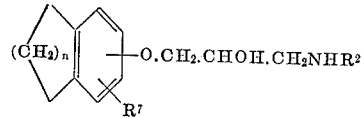

wherein $R^2$ is selected from hydrogen, alkyl of 2 to 10 carbon atoms, hydroxyalkyl of up to 4 carbon atoms, alkoxyalkyl of up to 5 carbon atoms, cyclohexyl, allyl and benzyl; $n$ is 1 or 2; and $R^7$ is selected from hydrogen, halogen, hydroxy, alkyl of up to 5 carbon atoms and alkoxy of up to 5 carbon atoms; and the pharmaceutically-acceptable acid addition salts thereof.

2. A homocyclic compound as claimed in claim 1 wherein $R^2$ is isopropyl, $n$ is 1 or 2 and $R^7$ is hydrogen.

3. A compound selected from the group consisting of 1-isopropylamino-3-(5,6,7,8-tetrahydro-1-naphthoxy)-2-propanol, and the pharmaceutically-acceptable, acid addition salts thereof.

4. A compound selected from the group consisting of 1-s-butylamino-3-(5,6,7,8-tetrahydro-1-naphthoxy)-2-propanol, 1-n-hexylamino-3-(5,6,7,8-tetrahydro-1-naphthoxy)-2-propanol, 1-n-octylamino-3-(5,6,7,8-tetrahydro-1-naphthoxy)-2-propanol, 1-(4-indanyloxy)-3-isopropylamino-2-propanol, 1-(5-indanyloxy)-3-isopropylamino-2-propanol, 1-benzylamino-3-(5,6,7,8-tetrahydro-1-naphthoxy)-2-propanol, 1-ethylamino-3-(5,6,7,8-tetrahydro-1-naphthoxy)-2-propanol, 1-n-propylamino-3-(5,6,7,8-tetrahydro-1-naphthoxy)-2-propanol, 1-(2-n-propoxyethylamino)-3-(5,6,7,8-tetrahydro-1-naphthoxy)-2-propanol, 1-(2-ethylhexylamino)-3-(5,6,7,8-tetrahydro-1-naphthoxy)-2-propanol, 1-cyclohexylamino-3-(5,6,7,8-tetrahydro-1-naphthoxy)-2-propanol, 1-allylamino-3-(5,6,7,8-tetrahydro-1-naphthoxy)-2-propanol, 1-(2-hydroxy-1,1-dimethylethylamino)-3-(5,6,7,8-tetrahydro-1-naphthoxy)-2-propanol, 1-n-butylamino-3-(5,6,7,8-tetrahydro-1-naphthoxy)-2-propanol, 1-isopropylamino-3-(5,6,7,8-tetrahydro-2-naphthoxy)-2-propanol, 1-amino-3-(5,6,7,8-tetrahydro-1-naphthoxy)-2-propanol, and 1-isopropylamino-3-(4-chloro-5,6,7,8-tetrahydro-1-naphthoxy)-2-propanol, and the pharmaceutically-acceptable, acid addition salts thereof.

5. An acid addition salt of a compound according to claim 1, said salt being selected from the group consisting of hydrochlorides, hydrobromides, phosphates, sulphates, oxalates, lactates, tartrates, acetates, salicylates, citrates, benzoates, naphthoates, o-acetoxybenzoates, adipates, maleates or 1,1'-methylene-bis-(2-hydroxy-3-naphthoates) and salts derived from sulphonated polystyrene resins.

References Cited

UNITED STATES PATENTS

| | | | |
|---|---|---|---|
| 2,681,932 | 6/1954 | Dornfeld et al. | 260—570.7 XR |
| 2,817,675 | 12/1957 | Hofer et al. | 260—570.7 XR |
| 2,835,669 | 5/1958 | Thoma | 260—570.6 XR |
| 2,033,640 | 5/1962 | Hofer et al. | 260—570.6 XR |
| 3,051,709 | 8/1962 | Shapiro et al. | 260—268 |
| 3,234,211 | 2/1966 | Huebner et al. | 260—570.7 XR |

OTHER REFERENCES

Adams et al.: "Organic Reactions," vol. 4, pp. 174–77 (1949).

Biel et al.: "Journal American Chem. Soc.," vol. 76, pp. 3149–53 (1954).

Elseviet's "Encyclopaedia of Organic Chemistry," vol. 12B, series III, pp. 1121–22 (1950).

Omiya et al.: "Chemical Abstracts," vol. 49, p. 10519 (1955).

Yamada et al.: "Chemical Abstracts," vol. 48, pp. 9350–51 (1954).

Shapiro et al.: "Journ. Med. and Pharm. Chem.," vol. 5, pp. 69–76 (1962).

Wegner et al.: "Synthetic Organic Chemistry," pp. 480–2 (1953).

CHARLES B. PARKER, *Primary Examiner.*

R. V. HINES, *Assistant Examiner.*

U.S. Cl. X.R.

260—570.7, 570.9, 404, 566, 623, 611, 490, 488, 501.19, 349, 477, 348, 621; 167—65